(12) United States Patent
Blackmer et al.

(10) Patent No.: US 12,314,779 B2
(45) Date of Patent: May 27, 2025

(54) GRAPHICAL USER INTERFACE FOR DESIGNING INTER-PROCESS COMMUNICATION

(71) Applicant: SpiceCSM, LLC, Potsdam, NY (US)

(72) Inventors: Peter Blackmer, Potsdam, NY (US); Jason Fregoe, Bombay, NY (US); Justin Wagschal, Lowville, NY (US); Marcus Alvarez, Potsdam, NY (US)

(73) Assignee: SpiceCSM, LLC, Potsdam, NY (US)

( * ) Notice: Subject to any disclaimer, the term of this patent is extended or adjusted under 35 U.S.C. 154(b) by 465 days.

(21) Appl. No.: 17/978,577

(22) Filed: Nov. 1, 2022

(65) Prior Publication Data

US 2023/0138091 A1 May 4, 2023

Related U.S. Application Data

(60) Provisional application No. 63/275,780, filed on Nov. 4, 2021.

(51) Int. Cl.
*G06F 9/54* (2006.01)
*G06F 9/451* (2018.01)

(52) U.S. Cl.
CPC ............... *G06F 9/54* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 4,860,204 A | 8/1989 | Gendron et al. | |
| 5,487,141 A | 1/1996 | Cain et al. | |
| 5,537,630 A | 7/1996 | Berry et al. | |
| 5,625,823 A | 4/1997 | Debenedictis et al. | |
| 5,678,013 A | 10/1997 | Smith et al. | |
| 5,862,379 A | 1/1999 | Rubin et al. | |
| 5,896,532 A | 4/1999 | Blewett | |
| 6,282,699 B1 | 8/2001 | Zhang et al. | |
| 6,425,120 B1 | 7/2002 | Morganelli et al. | |

(Continued)

FOREIGN PATENT DOCUMENTS

| | | |
|---|---|---|
| EP | 3106980 A1 | 12/2016 |
| WO | 2000049498 A1 | 8/2000 |
| WO | 2003081389 A2 | 10/2003 |

OTHER PUBLICATIONS

International Search Report & Written Opinion mailed Mar. 10, 2023, in international application No. PCT/US2022/048570, 7 pages.

*Primary Examiner* — Craig C Dorais
(74) *Attorney, Agent, or Firm* — Blueshift IP; Robert Plotkin

(57) ABSTRACT

A computer system provides a software application which enables users to define and implement communications among processes without writing code in a programming or scripting language. Instead, users may define and implement such inter-process communications using a user-friendly graphical user interface. The resulting inter-process communications may be executed among multiple processes executing in parallel with each other. Processes may provide data to each other sequentially or non-sequentially. In this way, the system enables users who are not programmers to define and implement inter-process communications quickly and easily.

18 Claims, 10 Drawing Sheets

(56) References Cited

U.S. PATENT DOCUMENTS

| | | | |
|---|---|---|---|
| 6,437,805 | B1 | 8/2002 | Sojoodi et al. |
| 6,684,385 | B1 | 1/2004 | Bailey et al. |
| 6,701,513 | B1 | 3/2004 | Bailey |
| 7,694,272 | B2 | 4/2010 | Bronicki et al. |
| 7,958,454 | B2 | 6/2011 | Gaudette |
| 8,478,616 | B2 | 7/2013 | De Klerk et al. |
| 8,495,510 | B2 * | 7/2013 | Pradhan .................. G06F 9/451 715/764 |
| 8,584,082 | B2 | 11/2013 | Baird et al. |
| 8,612,870 | B2 | 12/2013 | Kodosky et al. |
| 9,841,878 | B1 | 12/2017 | Morris |
| 10,222,926 | B2 * | 3/2019 | Pandian .................... G06F 9/54 |
| 10,489,126 | B2 | 11/2019 | Kumar et al. |
| 11,579,764 | B1 * | 2/2023 | Argroves ............ G06F 11/3409 |
| 2006/0064674 | A1 | 3/2006 | Olson, Jr. et al. |
| 2009/0119578 | A1 | 5/2009 | Relyea et al. |
| 2009/0313601 | A1 | 12/2009 | Baird et al. |
| 2011/0225495 | A1 | 9/2011 | Casalaina et al. |
| 2012/0102412 | A1 | 4/2012 | Sinclair et al. |
| 2015/0193123 | A1 | 7/2015 | Inukonda et al. |
| 2016/0321314 | A1 | 11/2016 | Reich et al. |
| 2016/0371064 | A1 | 12/2016 | Rougerie et al. |
| 2020/0034120 | A1 | 1/2020 | Hoff |
| 2020/0301679 | A1 | 9/2020 | Eteminan et al. |

\* cited by examiner

| | | |
|---|---|---|
| Event Type: | Incident ▼ | |
| Status: | In Progress ▼ | |
| Disposition: | Reservation ▼ | |
| Sub Disposition: | Availability Inquiry ▼ | |
| Impact: | None ▼ | |
| Urgency: | None ▼ | |
| Priority: | None ▼ | |
| Tier: | Tier 1 ▼ | |
| Assigned Agent: | Giardina, Chris ▼ | |
| External ID: | | |

☐ Notify assigned agent

⊘ Complete

Wrap Up Response

Default Path: [notmember ▼]   Advanced: ☐

Switch Variable: [con_ExtraData1]

Switch Conditions (Basic)

⊕ Add Condition

The Default Path will be used if no conditions are fulfilled.

If Switch Variable
Operator: [Equals ▼]   Value: #☐[Silver]   [✕ Remove]
Switch To: [member ▼]

If Switch Variable
Operator: [Equals ▼]   Value: #☐[Gold]   [✕ Remove]
Switch To: [member ▼]

If Switch Variable
Operator: [Equals ▼]   Value: #☐[Platinum]   [✕ Remove]
Switch To: [member ▼]

CRM Search Results Configuration ✕

| ID | $crmResults1603396567716 |
| Target ID | $crmDisplay1603396570320 |

⬤ Open Sub View

Sub View: Spice Default Record ▼

⬤ Hide Header

Header Text: CRM Search Results

⬤ Hide New Case

Save

FIG. 7

```
widgetComms(type,data){
    const _ = this.$$scope.app.getService("locale")._;

switch(type){
        case "test":
            webix.message({
                text: _("Communication test call with Case History successful."),
                type: "success",
                expire: 5000
            });
            break;
        case "loadcases":
            this.config.cid = data.cid;
            this.config.record = data.record
            this.widgetComms({type: "refreshcases", data: {}});
            break;
        case "refreshcases":
            const this = this;
            const grid = this.$$({id: "admin.viewEdit.caseHistory.grid"});
            grid.clearAll();
            const post = {
                cid: this.config.cid,
                rid: this.config.record.RecordID,
                status: this.config.statusLimit,
                disposition: this.config.dispositionLimit,
                assigned: this.config.assignedLimit,
            };
```

FIG. 8

GRAPHICAL USER INTERFACE FOR DESIGNING INTER-PROCESS COMMUNICATION

BACKGROUND

Different computer programming languages strike different balances between power and ease of use. For example, programming in machine language enables programmers to write programs that are extremely powerful and that execute very quickly, but at the expense of requiring a significant investment of time and effort to learn how to program in machine language. At the other end of the spectrum are programming languages that are designed to maximize ease of use, such as Python. Although it takes significantly less effort to learn how to program in such languages, the resulting programs do not execute as efficiently and, as a result, are not suitable for applications that require massive amounts of data to be processed in short periods of time, such as speech recognition.

Even the most user-friendly textual programming languages still require an up-front investment of time and effort that is impractical for many business users who are not full-time programmers. Yet it would be beneficial for such users to be able to create, or at least customize, business applications. In response to this need, various visual programming languages and graphical process builders have been developed. Such tools enable users to design processes by selecting, dragging, and dropping visual elements in a graphical user interface, thereby at least partially replacing the need to write textual software code.

Existing graphical software creation tools, however, do not enable their users to create the full range of applications that could be created using purely textual programming languages. As a result, users are faced with a choice between investing significant resources into learning how to write code in a purely textual programming language in order to generate more powerful applications on one hand, and saving resources by using a graphical software creation tool that can only create applications having limited power on the other hand.

What is needed, therefore, are systems and methods for increasing the range of software applications that can be created using graphical software creation tools.

SUMMARY

A computer system provides a software application which enables users to define and implement communications among processes without writing code in a programming or scripting language. Instead, users may define and implement such inter-process communications using a user-friendly graphical user interface. The resulting inter-process communications may be executed among multiple processes executing in parallel with each other. Processes may provide data to each other sequentially or non-sequentially. In this way, the system enables users who are not programmers to define and implement inter-process communications quickly and easily.

Other features and advantages of various aspects and embodiments of the present invention will become apparent from the following description and from the claims.

BRIEF DESCRIPTION OF THE DRAWINGS

FIG. 1 is an illustration an example graphical user interface (GUI) of a software application for implementing certain embodiments of the present invention.

FIG. 2 is an illustration of a GUI representing an event that has occurred within a hotel CRM application according to one embodiment of the present invention.

FIG. 4 is an illustration of a GUI used to define logic according to one embodiment of the present invention.

FIG. 5 is an illustration of a GUI for enabling a user to create and use multiple views of data in a database according to one embodiment of the present invention.

FIG. 6 is an illustration of a GUI for enabling a user to define process-related parameters of a widget according to one embodiment of the present invention.

FIG. 7 is an illustration of a GUI for enabling a user to specify a sub-view of a widget according to one embodiment of the present invention.

FIG. 8 is an illustration of a mechanism used to implement inter-process communication according to one embodiment of the present invention.

DETAILED DESCRIPTION

Figure 3:
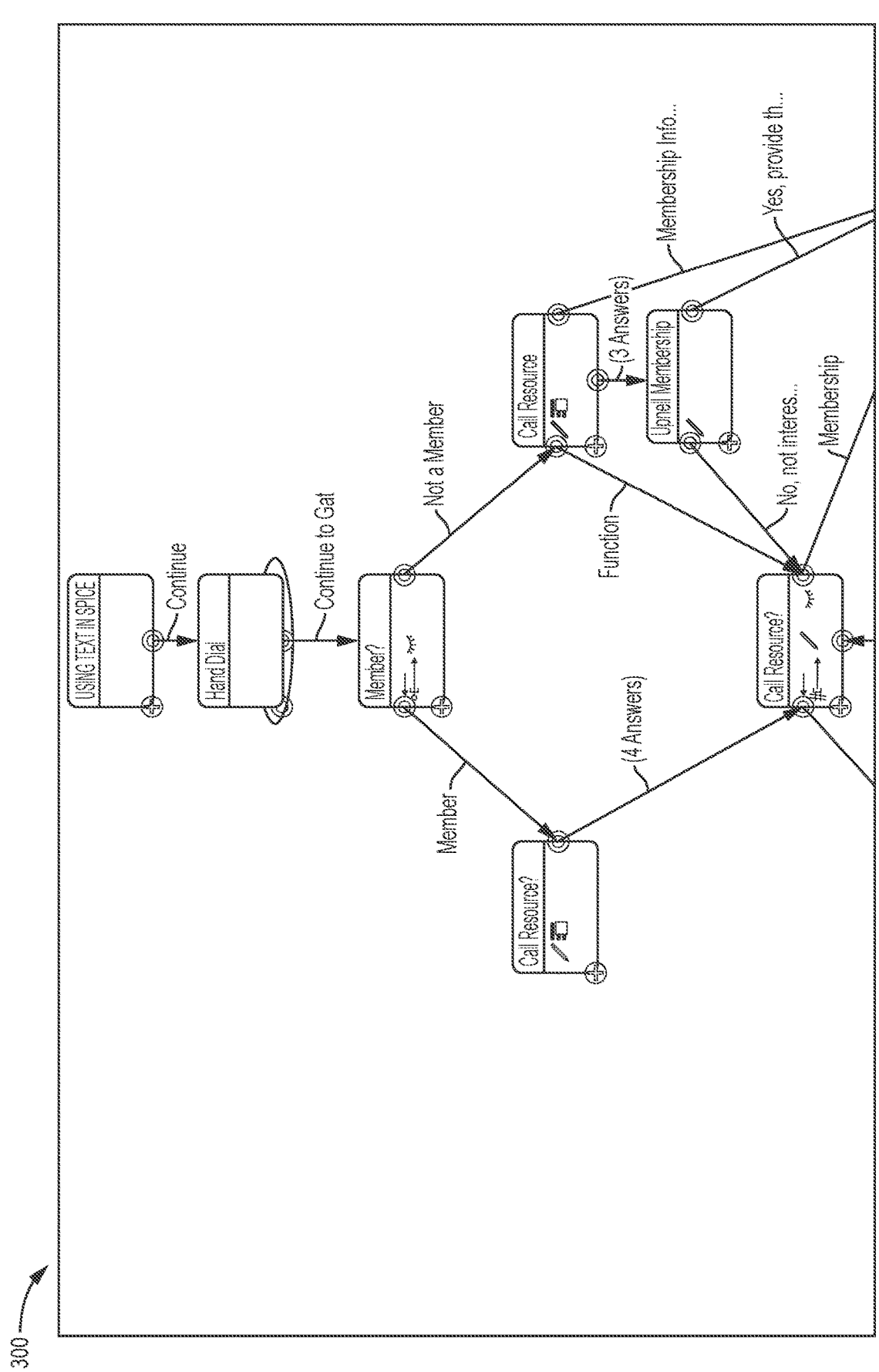
FIG. 3 is an illustration of a GUI displayed by a process editor when a process is being created by a user according to one embodiment of the present invention.

Embodiments of the present invention include computer-implemented systems and methods for enabling a user to define and implement inter-process communication in a software application using a user-friendly graphical user interface, without requiring the user to write code in a conventional computer programming or scripting language.

Certain embodiments of the present invention will be illustrated and described herein in connection with a customer relationship management (CRM) software application, particularly a CRM that manages customer interactions with a call center. Such embodiments, however, are merely examples and do not constitute limitations of the present invention, which is not limited to the context of CRM applications or call centers. Instead, embodiments of the present invention may be used to define and implement inter-process communication within any kind of software application. As a result, the description herein refers generically to a "software application" which implements features of embodiments of the present invention.

Figure 1:
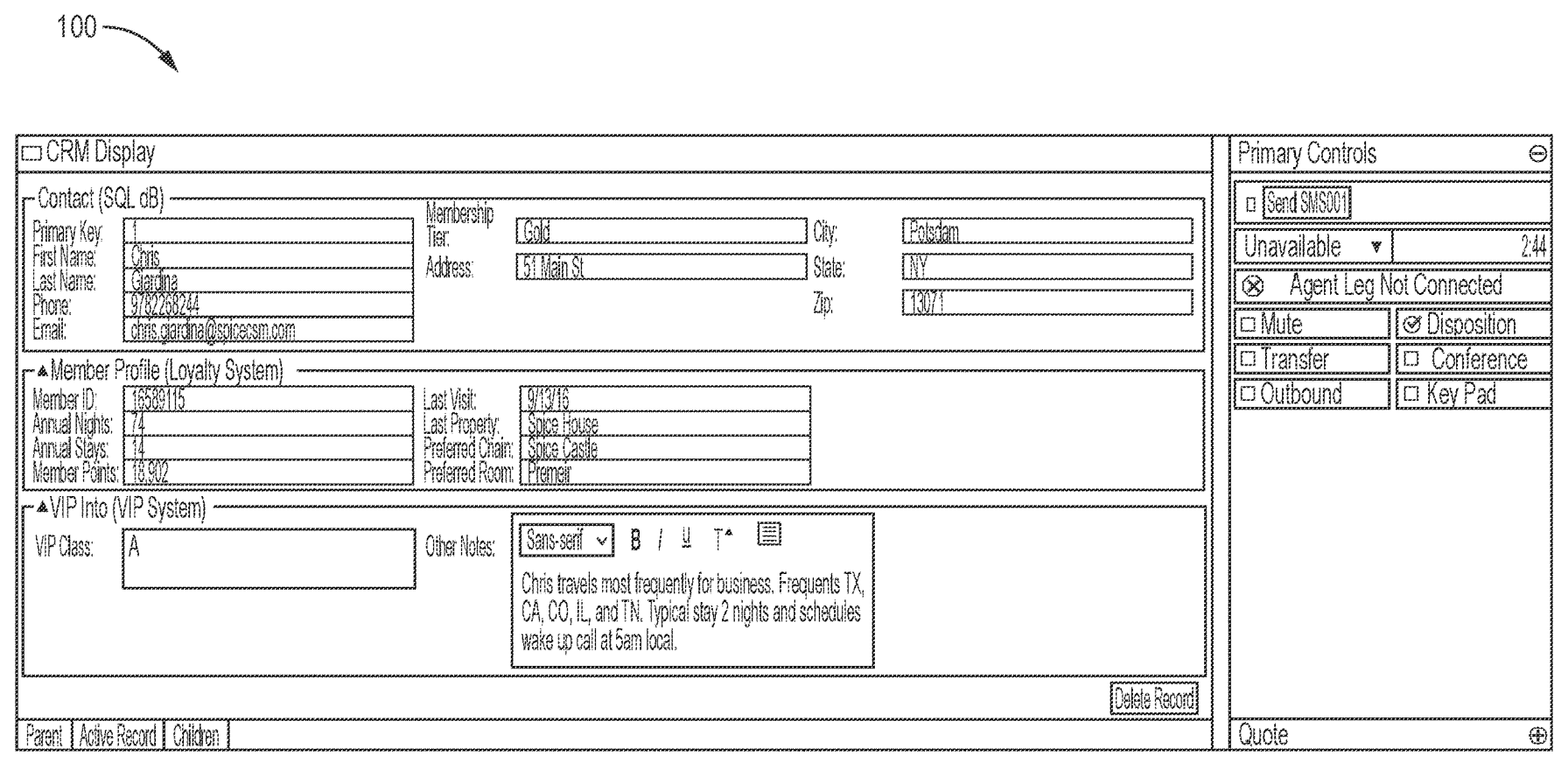

Referring to FIG. 1, an illustration is shown of an example graphical user interface of a software application for implementing certain embodiments of the present invention. In the particular example of FIG. 1, the software application is a CRM application which has been customized to implement hotel customer service functionality. As will be described in more detail below, the hotel customer service functionality may be defined by a particular "campaign," which may be one of a plurality of campaigns within the software application. Each such campaign may include its own graphical user interface(s), rules, processes, and data.

The graphical user interface (GUI) illustrated in FIG. 1 shows a record for a particular customer of a hotel. That record includes a plurality of fields containing data related to the customer. For example, the record includes a Primary Key field, containing the customer's primary key. This is a unique value in the customer database that may be used to uniquely identify the customer's record within the database.

The record also includes First Name and Last Name fields, representing the first and last names of the customer, respectively. These and other fields shown in FIG. 1 are merely examples and not limitations of the present invention.

As will be described in more detail below, the software application is fully customizable by the user. For example, the user may add, remove, or modify campaigns within the software application. Within each campaign, the user may add, remove, or modify display widgets, such as by adding, removing, and modifying user interface elements (e.g., text boxes, checkboxes, and menus) within those widgets and the layout of those user interface elements within widgets. Furthermore, and as will be described in more detail below, the user may define processes in association with widgets and may define inter-process communication among those processes.

The software application may include and/or interface with a database, which may be used to store some or all of the data described herein, such as any data associated with campaigns, such as user interfaces, data, processes, and rules.

The software application illustrated in FIG. 1 may include or interface with a telephone system. When a caller makes a telephone call and that telephone call is received by the software application of FIG. 1, the telephone system may provide information about the telephone call to the software application of FIG. 1, which may look up that information in its own database and identify a customer record (if any) which matches the received information. For example, the telephone system may provide the caller ID of the caller to the software application of FIG. 1, which may search for and find a customer record having that telephone number stored in its Phone field. The software application may then retrieve that customer record and display it, such as is shown in FIG. 1.

The user may provide various kinds of input to update the customer record shown in FIG. 1, such as by typing text into text field, checking check boxes, and selecting items from dropdown menus, in response to which the software application may update the customer record based on the user input. Techniques that may be used to enable the user to update the customer record using the user interface of FIG. 1 are well-known to those having ordinary skill in the art.

The software application of FIG. 1 may also automatically retrieve information from other systems, and update the customer record based on that retrieved information. For example, the software application may retrieve from a map system (e.g., Google Maps), based on an address, a map containing that address, and insert the map into the customer record. This is merely one example of a way in which the software application may automatically retrieve information from an external system and store that retrieved information in the customer record or otherwise update the customer record based on the retrieved information.

FIG. 2 shows a GUI 200 representing an event that has occurred within the hotel CRM application of FIG. 1. The GUI 200 of FIG. 2 may, for example, be displayed by the software application and be edited by the user during and/or at the completion of a call or other communication from the customer represented by the customer record of FIG. 1. If the purpose of the customer's phone call was, for example, to make a reservation, then the user may select "Reservation" as the Disposition in the GUI 200 of FIG. 2. This is merely an example, as is the entirety of FIG. 2, the purpose of which more generally is to show that the software application may generate and store records of communications with customers.

The software application may include a plurality of rules. Each such rule may have a condition and an action. The software application may repeatedly evaluate each of the rules to determine whether that rule's conditions are satisfied. If the software application determines that the condition of a particular rule is satisfied, then the software application may, in response to that determination, execute the rule's action. The software application may perform such evaluation of the rules periodically and/or immediately in response to their conditions being satisfied. For example, the software application may evaluate certain rules periodically, such as every minute, hour, day, or week, and then execute the action of any such rule whose condition has been satisfied. The software application may evaluate certain other rules any time certain events occur within the system (such as whenever variable values have been updated or process components have been executed), and then immediately execute the action of any such rule whose condition has been satisfied.

As a particular example of a rule, one such rule may indicate that if an incident's Disposition is changed to "Reservation" (condition), then the software application should send a visit summary message (e.g., email) to the customer associated with the incident (action). If the software application were to evaluate such a rule in connection with the incident record of FIG. 2, the software application would determine that the rule's condition has been satisfied because the value of the incident record's "Disposition" field is "Reservation," and the software application would, in response that determination, send a visit summary message to the customer.

In the particular example shown in FIG. 2, the user has selected "Availability Inquiry" as the value of the "Sub-Disposition" field. The rules may include a rule which has "Sub-Disposition=Availability Inquiry" as a condition, and which has, as its action, an action of sending a reminder to the customer in two days to book the room that the customer inquired into. As a result, in two days the application will send a reminder message to the customer. This is merely one additional example of a rule and how such a rule may be triggered and executed by the system.

Sending a message is merely one example of a rule's action. Other non-limiting examples include executing scripts, sending surveys, and uploading or downloading SFTP files.

The software application may store, in its database, a record of all interactions between the software application and the user, such as messages sent by the application to the user, actions taken by the user within the application, messages sent by the application to the customer and by the customer to the application, and rules that have been executed by the application in connection with the user and/or customer. Such a record may be stored within, or in association with, the customer record, so that the user (and other users of the application) can view the history of actions that are relevant to the customer.

The software application may also include a process editor. In general, the process editor provides users of the software application with the ability to create, store, and edit processes using a graphical user interface. The process editor enables the user to create and edit forms, create scripts, define communications with external sources through APIs, and define inter-process communication within the software application. The process editor may store processes that it creates in any form, such as in a JSON file within the database, where each process is stored in its own JSON file.

The software application may also include a process reader, which may read processes created by the process editor and execute those processes. The process reader may execute a plurality of such processes in parallel with each other. Any description herein of executing processes should be understood to refer to the process reader executing those processes.

An example of a user interface that may be displayed by the process editor, showing a process that is being created by the user, is shown in FIG. 3.

The user interface of FIG. 3 may include a palette of process components icons, each of which represents a distinct type of process component. The user may drag and drop any of these process components into the center pane of the user interface, and thereby add that process component into the process being edited. The user may add directional lines connecting two process components, thereby specifying a flow of control and/or data between those two process components.

As can be seen in the center pane of the user interface in FIG. 3, the process being edited includes a node (process component) labeled "Member?". In general, this node evaluates whether a customer is a member and takes appropriate action depending on whether the customer is a member. FIG. 4 shows a user interface that may be used by the user to define the logic executed by the "Member?" node.

As shown in FIG. 4, the user has entered "con_Extra-Data1" as the name of a Switch Variable on which the "Member?" node is to operate. As further shown in FIG. 4, the user has selected "notmember" as the Default Path to be taken by the "Member?" node, by selecting "notmember" from a dropdown list. As further shown in FIG. 4, the user has entered "member" as the Path to be taken by the "Member?" node if the Switch Variable is equal to Silver, Gold, or Platinum, by selecting "member" from a dropdown list in connection with those values. As a result, when the "Member?" node is executed, if the value of the Switch Variable (con_ExtraData1) is equal to Silver, Gold, or Platinum, then the "Member?" node will take the "member" path; otherwise, the "Member?" node will take the "notmember" path. As shown in FIG. 3, the "member" path leads to one process component, and the "notmember" path leads to a different process component.

Although the illustration of FIG. 4 is merely one specific example of how the software application may provide a graphical user interface which enables the user to define logic within a process component, the example of FIG. 4 illustrates that the user may define such logic merely by using a graphical user interface, such as by selecting items from dropdown lists and entering simple text (e.g., variable names) within text fields, and without writing code in a programming language or scripting language, such SQL, HTML, PHP, Python, etc. The user interface of FIG. 4 enables the user to define "if/then/else" logic in this way.

Figure 5:
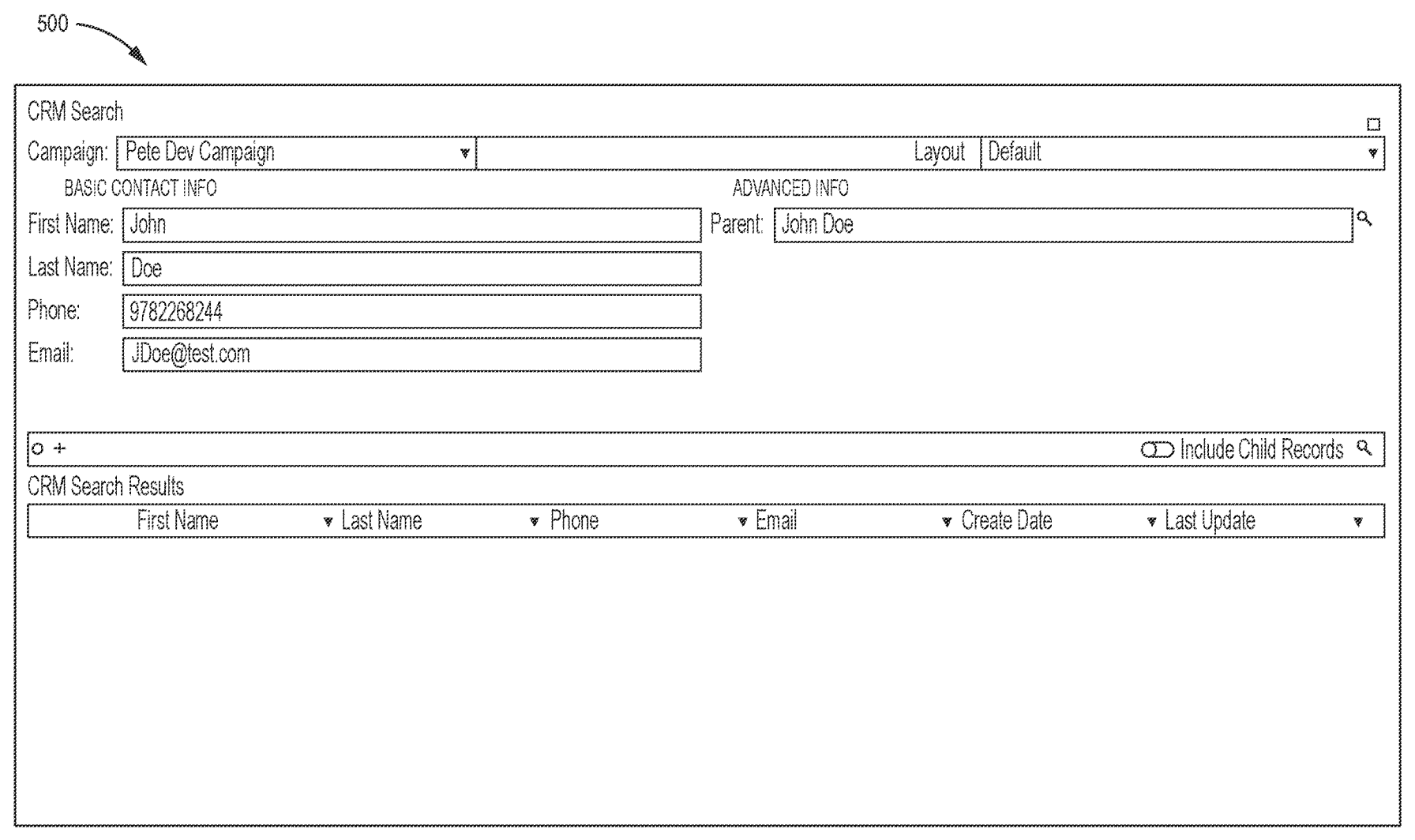

As shown in FIG. 5, the software application may enable the user to create and use multiple views of data in the database. In the particular example of FIG. 5, two views are shown: a "Spice Default Home" view and a "Web Mail" view. These two views are merely examples and do not constitute limitations of the present invention. Each view may contain its own set of widgets, each of which is configured to display particular data in a particular layout. The user may select any combination of widgets for inclusion within a view, and customize the data and layout of each such widget within the view. In this way, the user may customize the view as a whole, and thereby customize the user interface that is provided by the software application to its users when those users select the view. The software application may also include one or more pre-customized views, so that the user does not need to create all desired views from scratch. The user may use any of the pre-customized views out of the box, or further customize those pre-customized views.

In the example of FIG. 5, the "Spice Default Home" view has been selected by the user. As a result, the user interface of FIG. 5 displays the selected "Spice Default Home" view, which contains two display widgets: a "CRM Search" widget and a "CRM Search Results" widget.

The "CRM Search" widget includes a "Campaign" menu, from which the user may select a campaign from among a plurality of campaigns. Recall from above that the hotel campaign is an example of a campaign. In the example of FIG. 5, the user has selected the "Pete Dev Campaign," in response to which the software application has displayed the particular data and layout associated with the "Pete Dev Campaign" campaign (e.g., the "First Name" and "Last Name" fields, displayed in the particular locations shown in FIG. 5). Other campaigns (not shown in FIG. 5) may have their own data and layouts. If the user were to select one of those other campaigns from the "Campaign" menu, the software application would display the data and layout associated with the selected campaign.

Examples of ways in which the software application may enable the user to customize a widget is by enabling the user to select one or more fields to include within the widget, to select the locations of those fields within the widget, and to specify properties of those fields (such as their default values, if any, and whether they are required). Another way in which the software application may enable the user to customize a widget is by enabling the user to provide code, written in a programming language or scripting language, that defines the widget. In the latter case, when the software application displays the widget, the software application may execute the code previously provided by the user in connection with the widget. Such code may, for example, display information from the database to the user. Such code may, for example, provide prompts to the user to provide input, and then receive such input from the user. These are merely examples. The code provided by the user may perform any function when executed by the software application.

Figure 6:
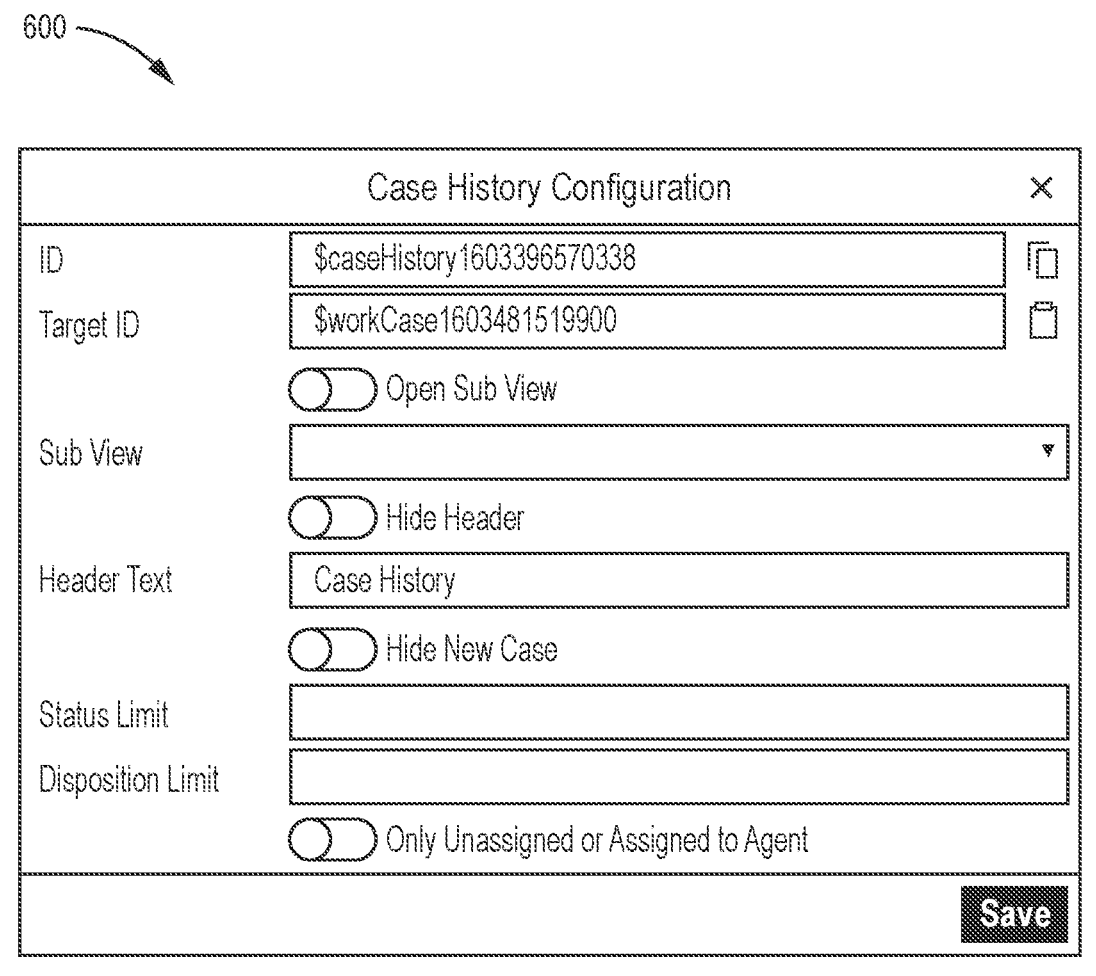

As shown in FIG. 6, the application may enable the user to define process-related parameters of any widget in a view. In the particular example of FIG. 6, the user has selected the Case History widget, and the software application has displayed a "Case History Configuration" dialog box which displays parameters of the Case History widget, including process-related parameters, and enables the user to edit those parameters of the Case History widget. For example, the dialog box displays:

A unique ID of the Case History widget. This unique ID may be generated automatically by the software application and be guaranteed to uniquely identify the Case History widget among all widgets in the software application. The software application may enable the user to edit this unique ID. As will be described in more detail below, a widget's unique ID may be used by other widgets as an address with which to specify the widget as the target of inter-process communication.

A Target ID associated with the Case History widget. The value of this Target ID parameter may, for example, be a unique ID of another widget in the same view as the Case History widget. In the particular example of FIG. 6, the Target ID of the Case History widget is the ID of the Work Case widget (see bottom left of FIG. 6). As will be described in more detail below, the Case History widget may provide output to the widget having the ID specified by the Target ID of the Case History widget (in this case, the Work Case widget). The value of the Target ID parameter may, for example, indirectly refer to a process that is external to the software application, such as an ID of a process in a web application, such as Salesforce. The Target ID may take any form, such as a URL.

The values of the ID and Target ID fields may be user-editable. Once the user has edited the values of either or both of those fields and pressed the "Save" button, the software application stores the user-entered values into the ID and Target ID fields of the Case History widget. As a result, when the Case History widget is executed, the Case History widget may provide some or all of its output to the widget having the ID specified by the Target ID of the Case History widget (in this case, the Work Case widget).

The particular example shown in FIG. 6 is merely an example and does not constitute a limitation of the present invention. More generally, the example shown in FIG. 6 illustrates one way in which the software application may enable the user to define one widget's target widget for inter-process communication. Furthermore, embodiments of the present invention are not limited to enabling a widget to have only a single target for inter-process communication. Embodiments of the present invention may use the technique of FIG. 6, for example, the enable the user to define multiple targets of inter-process communication for a particular widget, such as by providing multiple target IDs of multiple corresponding widgets for a particular widget.

Furthermore, the technique of FIG. 6 may be used to provide different target IDs for each of a plurality of widgets in a particular view. As a result, the technique of FIG. 6 may be used to chain the outputs of a plurality of widgets. For example, if the technique of FIG. 6 is used to define Widget B as the target of Widget A, and to define Widget C as the target of Widget B, then when Widgets A, B, and C are executed, Widget A may provide its output to Widget B, and Widget B may provide its output to Widget C. This is an example of the "chaining" just described. There is no limit to the number of widgets that may be in such a chain.

The technique of FIG. 6 may define output topologies other than chains. For example, the user may use the technique of FIG. 6 to specify that Widget A has Widget B as its target, that Widget B has Widget C as its target, and that Widget C has Widget A as its target, thereby defining an output loop. Yet other topologies are possible and fall within the scope of the present invention.

Multiple widgets may execute in parallel with each other. In other words, when a first widget is executing, a second widget may execute without requiring that the first widget complete or suspend execution. As a result, the inter-process communications defined using the technique of FIG. 6 may occur in parallel with each other. For example, if Widget A has Widget B as its target and Widget B has Widget C as its target, then when Widgets A, B, and C execute, Widget A may provide its output to Widget B in parallel with Widget B providing its output to Widget C. If Widget A repeatedly provides outputs to Widget B, and Widget B repeatedly provides outputs to Widget C, then Widget A may provide outputs to Widget B in any interwoven manner with Widget B providing outputs to Widget C. As merely one arbitrary example for the sake of illustration only, such an output pattern may occur in the following sequences:

Widget A provides output A1 to Widget B
Widget B provides output B1 to Widget C
Widget A provides output A2 to Widget B
Widget A provides output A3 to Widget B
Widget B provides output B2 to Widget C
Widget B provides output B3 to Widget C
Widget A provides output A4 to Widget B
Widget B provides output B4 to Widget C It should be understood that the example above is provided merely to illustrate that Widgets A and B may provide their outputs in parallel with each other in any sequence.

When one widget receives, as input, output from another widget, the receiving widget may execute any process on that received input. The receiving widget may, for example, update its display output based on the input received from the other widget. As a particular example, if the "CRM Search" widget in FIG. 5 provides search results to the "CRM Search Results" widget in FIG. 5, the "CRM Search Results" widget may provide output representing some or all of those search results. This is merely one example of a way in which one widget may update its display output based on input received from another widget.

A widget may include a "sub-view." For example, the "CRM Search Results" view may have a "Spice Default Record" sub-view. The user may specify the sub-view, if any, of a widget using a graphical user interface, such as that shown in FIG. 7. In the example of FIG. 7, the user has enabled the "Open Sub View" option for the "CRM Search Results" widget and has specified that the sub-view of the "CRM Search Results" widget is the "Spice Default Record" widget. As a result, when the "CRM Search Results" widget is displayed, it will: (1) display the specified sub-view (even if it is not currently displayed); and (2) provide its output to the specified sub-view.

FIG. 8 illustrates an example of a mechanism that may be used to implement inter-process communication according to one embodiment of the present invention. FIG. 8 illustrates code for a process named "widgetComms," which receives two variables—"type" and "data"—as inputs. Each widget may have its own widgetComms process, of the type shown in FIG. 8, for handling inter-process communications. The particular code shown in FIG. 8 is merely an example of code for one particular widgetComms process for one particular widget, and does not constitute a limitation of the present invention.

As shown in FIG. 8, the widgetComms process includes a switch statement, which switches on the value of the "type" input. In general, the type variable indicates the process to be performed by the widgetComms process. As this implies, if Widget A communicates with Widget B, then Widget A may call Widget B's widgetComms process with a type input that has a value specifying the process to be performed by Widget B. When Widget B receives that type input from Widget A, the switch statement in Widget B's widgetComms process will switch to the code corresponding to the value of the type input.

In the particular example of FIG. 8, the widgetComms process includes at least three cases, labeled as "test," "loadcases," and "refreshcases." What is relevant about these three cases is that each of them contains its own corresponding set of code (e.g., JavaScript code) to be executed. The particular code shown in FIG. 8 is merely an example and not a limitation of the present invention. The code for any of the cases may operate on the "data" input received by the widgetComms method.

In summary, therefore, if Widget A wishes to cause Widget B to perform a particular process on particular data, then Widget A may call Widget B's widgetComms process with a "type" input that has a value specifying the process to be performed by Widget B, and with a "data" input that contains the data to be operated on by the specified process. When Widget A makes that call of Widget B's widgetComms process, Widget B will use the switch statement shown in FIG. 8 to execute the process specified by the "type" input on the data specified by the "data" input. As this implies, a user may provide code for one or more cases of Widget B's widgetcomms method to define the processes that are to be performed by Widget B when other widgets communicate with Widget B.

The description above illustrates how embodiments of the present invention may be used to enable a user to define inter-process communication between and among two or more processes in a software application, without requiring that user to write code in a programming language or scripting language. Instead, the user may merely use a user-friendly graphical user interface to specify the linkages among processes, including the data to be provided by one process to another. The software application may then automatically implement the user-specified inter-process communications and execute those communications without further effort by the user. In this way, embodiments of the present invention may be used to implement inter-process communication easily and efficiently.

Having described various embodiments of the present invention in connection with specific examples, now systems and methods will be described that may be used to implement certain embodiments of the present invention. For example, referring to FIG. 9, a dataflow diagram is shown of a system 900 for implementing inter-process communication between two or more processes according to one embodiment of the present invention. Referring to FIG. 10, a flowchart is shown of a method 1000 performed by the system 900 of FIG. 9 according to one embodiment of the present invention.

The system 900, which may be implemented on one or more computers, may include a first widget 904a and a second widget 904b. The first widget 904a may include (or otherwise be associated with), for example, a first GUI element 906a, first data 908a, and a first process 910a. The second widget 904b may include (or otherwise be associated with), for example, a second GUI element 906b, second data 908b, and a second process 910b.

Each of the GUI elements 906a-b may, for example, include any kind of known or future-developed GUI element(s), such as one or more text boxes, dropdown lists, menus, checkboxes, radio buttons, and dialog boxes, in any combination. Each of the GUI elements 906a-b may, for example, include either or both of the following:
  data defining the GUI element, such as data that may be rendered to generate visual output based on the data defining the GUI element; and/or
  the rendered GUI element, presented as output by an output device, such as a display screen.

The first data 908a and the second data 908b associated with the first widget 904a and the second widget 904b, respectively, may include any number and type of data, in any combination, such as any of the data disclosed herein. For example, the first data 908a and second data 908b may include one or more data fields, each of which may have an associated data type, and which may be associated with a corresponding unique identifier (e.g., name).

Each of the processes 910a-b may, for example, include either or both of the following:
  data defining the process, such as source code and/or object code written in any programming language(s);

a process that is executing on a computer.

For example, the first process 910a may include source code defining a particular algorithm. Alternatively or additionally, the first process 910a may be or include a process executing on a computer, such as a process executing the particular algorithm defined by the source code contained in the first process 910a.

The first widget 904a and the second widget 904b may, for example, both be part of a single software application. As another example, the first widget 904a and the second widget 904b may be part of different software applications (i.e., the first widget 904a may be part of a first software application, and the second widget 904b may be part of a second software application). As this implies, the inter-process communication that occurs between the first widget 904a and the second widget 904b may occur between a first software application (which contains the first widget 904a) and a second software application (which contains the second widget 904b).

Figure 9:
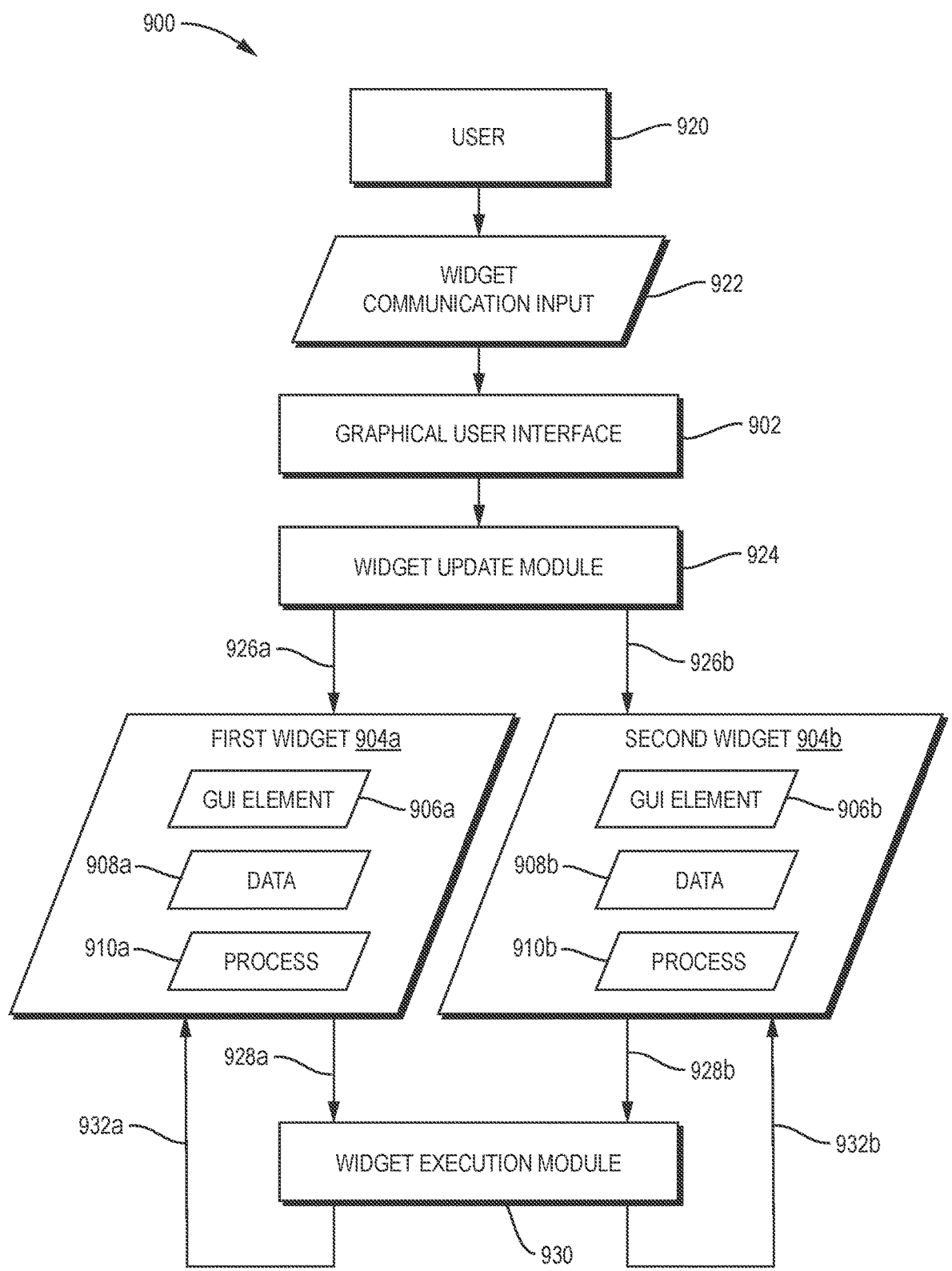
FIG. 9 is a dataflow diagram of a system for implementing inter-process communication between two or more processes according to one embodiment of the present invention.
Figure 10:
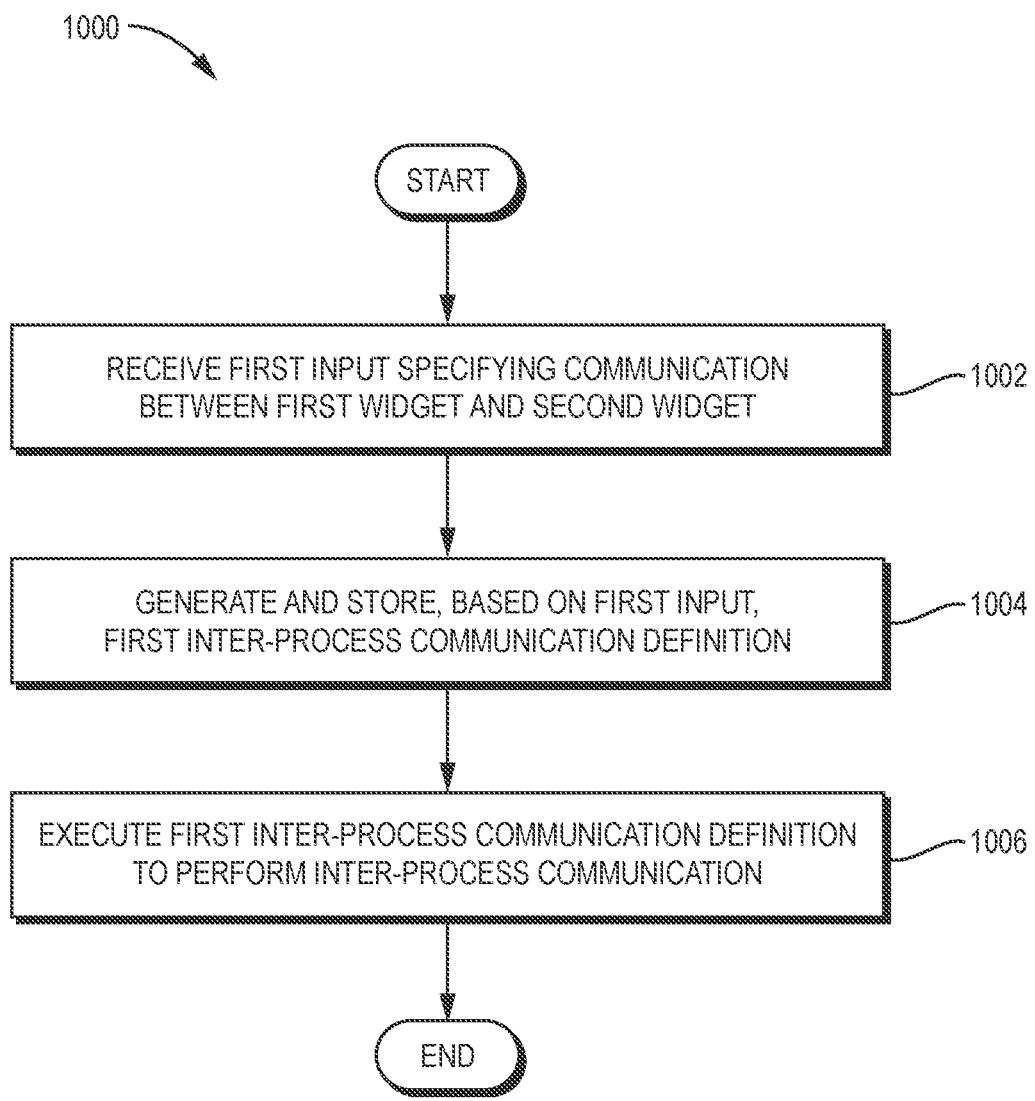
FIG. 10 is a flowchart of a method performed by the system of FIG. 9 according to one embodiment of the present invention.

Although only two widgets 904a-b are shown in FIG. 9 for ease of illustration, the system 900 may include any number of widgets (e.g., two, three, four, or more widgets). Although the GUI elements 906a-b, data 908a-b, and processes 910a-b are shown as being contained within the first widget 904a and second widget 904b, respectively, in FIG. 9, this is merely an example and does not constitute a limitation of the present invention. Instead, the GUI elements 906a-b, data 908a-b, and processes 910a-b may be stored in any suitable location(s), which need not be grouped within anything identifiable as a widget in the manner shown in FIG. 9. As one particular example, the processes 910a-b may be implemented, at least in part, using source code stored within a database, where source code defining the first process 910a is stored in a first file (e.g., a first JSON file) in the database, and where source code defining the second process 910b is stored in a second file (e.g., a second JSON file) in the database.

The system 900 also includes a graphical user interface 902, which may be output by, and receive input via, any kind of computer(s). The system 900 also includes a user 920, who may provide widget communication input 922 (also referred to herein as "first input") to the system 900 via the graphical user interface 902. In this way, the system 900 receives the widget communication input 922 from the user 920 via the graphical user interface 902 (FIG. 10, operation 1002). The widget communication input 922 may specifying communication between the first widget 904a and the second widget 904b (e.g., between the first process 910a and the second process 910b) in any of a variety of ways.

The system 900 generates and stores, based on the widget communication input 922, a first definition of the communication between the first widget 904a and the second widget 904b (e.g., between the first process 910a and the second process 910b) (FIG. 10, operation 1004). This first definition, also referred to herein as the "first inter-process communication definition") is not shown explicitly in FIG. 9 and may take any of a variety of forms. For example, the first inter-process communication definition may include any one or more of the following, in any combination:
  Data specifying a source widget and a destination widget. For example, the first inter-process communication definition may include data specifying the first widget 904a as a source widget and data specifying the second widget 904b as a destination widget. As another example, the first inter-process communication definition may include data specifying the first GUI element 906a as a source GUI element and data specifying the second GUI element 906b as a destination GUI element.

Data specifying a source data element and a destination data element. For example, the first inter-process communication definition may include data (e.g. a field name of the first data 908a) specifying the first data 908a as a source data element and data (e.g., a field name of the second data 908b) specifying the second data 908b as a destination data element.

Data specifying a source process and a destination process. For example, the first inter-process communication definition may include data (e.g., a process name of the first process 910a) specifying the first process 910a as a source process and data (e.g., a process name of the second process 910b) specifying the second process 910b as a destination process.

The first inter-process communication definition may, for example, be stored, in whole or in part, in the first widget 904a and/or the second widget 904b. For example, the system 900 may include a widget update module 924, which may update either or both of the first widget 904a and the second widget 904b, based on the widget communication input 922, via widget update outputs 926a and 926b, respectively.

For example, the widget update module 924 may store any one or more of the following in the data 908a of the first widget 904a (such as in a "Target ID" field of the data 908a):

data specifying the second widget 904b as a target of the first widget 904a;
data specifying the second GUI element 906b as a target of the first GUI element 906a;
data specifying the second data 908b as a target of the first data 908a;
data specifying the second process 910b as a target of the first process 910a.

Additionally or alternatively, any one or more of the following may be stored in the second data 908b of the second widget 904b:

data specifying the first widget 904a as a source of the second widget 904b;
data specifying the first GUI element 906a as a source of the second GUI element 906b;
data specifying the first data 908a as a source of the second data 908b;
data specifying the first process 910a as a source of the second process 910b.

The system 900 also includes a widget execution module 930, which may execute the first inter-process communication definition, which may include: (1) performing the first process associated with the first widget to generate first output; and (2) updating the second data of the second widget based on the first output (FIG. 10, operation 1006). As another example, the first process associated with the first widget may be executing, and in parallel with such execution the widget execution module 930 may update the second data of the second widget based on the first output. In other words, the widget execution module 930 may not perform the first process associated with the first widget; instead, the first process associated with the first widget may be performed (execute) without being performed by the widget execution module 930.

The widget execution module 930 may receive any data 928a from the first widget 904a and/or any data 928b from the second widget 904b, and use any such data to execute the first inter-process communication definition.

As merely two examples:

Assume that the first inter-process communication definition specifies communication between the first widget 904a and the second widget 904b, more particularly by specifying that the output of the first process 910a is to be provided as input to the second data 908b of the second widget 904b (i.e., by specifying the first process 910a as a source and by specifying the second data 908b as a target of that source). In this case, the first process 910a may execute to produce first output, and the first output may be used to update the second data 908b of the second process, such as by storing the first output in the second data 908b of the second widget.

Assume that the first inter-process communication definition specifies communication between the first widget 904a and the second widget 904b, more particularly by specifying that the output of the first process 910a is to be provided as input to the second process 910b (i.e., by specifying the first process 910a as a source and by specifying the second process 910b as a target of that source). In this case, the first process 910a may execute to produce first output, and the first output may be provided as input to the second process 910b. The second process 910b may execute on that input to produce second output. The system 900 may, for example, provide the second output as input to the first process 910a, or to a third executing process (not shown) associated with a third widget (not shown).

Any outgoing communication that the widget execution module 930 engages in with the first widget 904a, such as by providing output from the second widget 904b as input to the first widget 904a, is shown in FIG. 9 as output 932a. Similarly, any outgoing communication that the widget execution module 930 engages in with the second widget 904b, such as by providing output from the first widget 904a as input to the second widget 904b, is shown in FIG. 9 as output 932b.

The widget execution module 930 may, at any time, such as before, during, or after executing the first inter-process communication definition, display the first GUI element 906a of the first widget 904a and/or display the second GUI element 906b of the second widget 904b. Such displaying may include, for example, rendering the first GUI element 906a based on a definition of that first GUI element 906a and/or rendering the second GUI element 906b based on a definition of that second GUI element 906b.

Any of a variety of the actions described above may be performed in parallel with each other. For example, the widget execution module may execute the first process 910a and the second process 910b in parallel with each other, or the first process 910a and the second process 910b may otherwise execute in parallel with each other.

Various embodiments of the present invention solve one or more technical problems with one or more technical solutions having one or more technical effects. For example, inter-process communication between two or more processes executing on a computer is inherently a technical phenomenon that is inherently rooted in computer technology. The system 900 and method 1000 address the problem of how to implement inter-process communication between two or more processes executing on a computer and, more specifically, the problem of how to create executable code that implements inter-process communication. The system 900 and method 1000 solve these problems by enabling executable code implementing inter-process communication to be created efficiently, i.e., in a small number of steps, such as by merely specifying a target widget for a particular source widget. Furthermore, such executable code may be created without requiring compilation or recompilation.

In some embodiments, the techniques described herein relate to a method performed by at least one computer processor executing computer program instructions stored on at least one non-transitory computer-readable medium, the method including: (A) receiving, via a graphical user interface, first input specifying communication between a first widget and a second widget, wherein the first widget is associated with a first graphical user interface element, first data, and a first process; wherein the second widget is associated with a second graphical user interface element and second data; (B) storing, based on the first input, a first definition of the communication between the first graphical user interface element and the second graphical user interface element; and (C) executing the first definition, including: (C) (1) performing the first process associated with the first widget to generate first output; and (C) (2) updating the second data of the second widget based on the first output.

The first input may specify a unique identifier of the second widget; and (C) (2) may include: identifying the second widget based on the unique identifier of the second widget; and updating the second data of the second widget based on the first output.

The method may further include storing the unique identifier of the second widget in the first data associated with the first widget.

Receiving the first input may include receiving text specifying the unique identifier of the second widget.

The first input may specify the first process.

The first input may include a URL at which the first process is accessible.

The first input may specify an output of the first process, and (C) (2) may include updating the second data based on the output of the first process.

The first input may specify the second data.

The first input may include text specifying the second data.

The second widget may be associated with a second process, the first input may specify the second process, and (C) (2) may include providing the first output as input to the second process.

The method may further include: (D) performing the second process to generate second output based on the first output. Operations (C) (1) and (D) may be performed in parallel.

The method may further include providing the second output to the first process.

The method may further include providing the second output to a third process associated with a third widget, wherein the third widget is associated with a third graphical user interface element and third data.

Receiving the first input may include receiving the first input via a dropdown list.

A software application may include the first widget and the second widget.

A first software application may include the first widget, and a second software application may include the second widget.

In some embodiments, the techniques described herein relate to a system including at least one non-transitory computer-readable medium having computer program instructions stored thereon, the computer program instructions being executable by at least one computer processor to perform a method, the method including: (A) receiving, via a graphical user interface, first input specifying communication between a first widget and a second widget, wherein the first widget is associated with a first graphical user interface element, first data, and a first process; wherein the second widget is associated with a second graphical user interface element and second data; (B) storing, based on the first input, a first definition of the communication between the first graphical user interface element and the second graphical user interface element; and (C) executing the first definition, including: (C) (1) performing the first process associated with the first widget to generate first output; and (C) (2) updating the second data of the second widget based on the first output.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention provide data from one process executing on a computer process to another process executing on the computer processor. Such techniques are inherently rooted in computer technology and cannot be performed mentally or manually by a human.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

What is claimed is:

1. A method performed by at least one computer processor executing computer program instructions stored on at least one non-transitory computer-readable medium, the method comprising:
   (A) receiving, via a graphical user interface, first input specifying communication between a first widget and a second widget,
      wherein the first widget is associated with a first graphical user interface element, first data, and a first process;
      wherein the second widget is associated with a second graphical user interface element and second data;
   (B) storing, based on the first input, a first definition of the communication between the first graphical user interface element and the second graphical user interface element; and
   (C) executing the first definition, comprising:
      (C) (1) performing the first process associated with the first widget to generate first output; and
      (C) (2) updating the second data of the second widget based on the first output.

2. The method of claim 1:
   wherein the first input specifies a unique identifier of the second widget; and
   wherein (C) (2) comprises:
      identifying the second widget based on the unique identifier of the second widget; and
      updating the second data of the second widget based on the first output.

3. The method of claim 2, further comprising storing the unique identifier of the second widget in the first data associated with the first widget.

4. The method of claim 2, wherein receiving the first input comprises receiving text specifying the unique identifier of the second widget.

5. The method of claim 1, wherein the first input specifies the first process.

6. The method of claim 5, wherein the first input comprises a URL at which the first process is accessible.

7. The method of claim 1, wherein the first input specifies an output of the first process, and wherein (C) (2) comprises updating the second data based on the output of the first process.

8. The method of claim 5, wherein the first input specifies the second data.

9. The method of claim 8, wherein the first input comprises text specifying the second data.

10. The method of claim 1, wherein the second widget is associated with a second process, wherein the first input specifies the second process, and wherein (C) (2) comprises providing the first output as input to the second process.

11. The method of claim 10, further comprising:
   (D) performing the second process to generate second output based on the first output.

12. The method of claim 11, wherein (C) (1) and (D) are performed in parallel.

13. The method of claim 11, further comprising providing the second output to the first process.

14. The method of claim 11, further comprising providing the second output to a third process associated with a third widget, wherein the third widget is associated with a third graphical user interface element and third data.

15. The method of claim 1, wherein receiving the first input comprises receiving the first input via a dropdown list.

16. The method of claim 1, wherein a software application includes the first widget and the second widget.

17. The method of claim 1, wherein a first software application includes the first widget, and wherein a second software application includes the second widget.

18. A system comprising at least one non-transitory computer-readable medium having computer program instructions stored thereon, the computer program instructions being executable by at least one computer processor to perform a method, the method comprising:

(A) receiving, via a graphical user interface, first input specifying communication between a first widget and a second widget,
- wherein the first widget is associated with a first graphical user interface element, first data, and a first process;
- wherein the second widget is associated with a second graphical user interface element and second data;

(B) storing, based on the first input, a first definition of the communication between the first graphical user interface element and the second graphical user interface element; and (C) executing the first definition, comprising:
- (C) (1) performing the first process associated with the first widget to generate first output; and
- (C) (2) updating the second data of the second widget based on the first output.

\* \* \* \* \*